United States Patent [19]

La Porta et al.

[11] Patent Number: 5,563,939
[45] Date of Patent: Oct. 8, 1996

[54] METHOD AND SYSTEM FOR DELIVERING A COMMUNICATION SERVICE

[75] Inventors: Thomas F. La Porta, Thornwood, N.Y.; Malathi Veeraraghavan, Atlantic Highlands, N.J.

[73] Assignee: AT&T, Holmdel, N.J.

[21] Appl. No.: 164,521

[22] Filed: Dec. 9, 1993

[51] Int. Cl.⁶ .................................................. H04M 3/42
[52] U.S. Cl. ........................... 379/220; 379/219; 379/229; 379/112; 379/201; 379/130; 379/114; 379/59
[58] Field of Search ............................... 379/67, 207, 221, 379/246, 93, 92, 90, 105, 97, 219, 220, 229, 112, 113, 201, 114, 115, 211, 130, 131, 111, 56, 57, 58, 59, 60; 370/84, 110.1; 358/86

[56] References Cited

U.S. PATENT DOCUMENTS

| | | | |
|---|---|---|---|
| 4,555,594 | 11/1985 | Friedes et al. | 379/207 |
| 4,565,903 | 1/1986 | Riley | 379/220 |
| 4,577,066 | 3/1986 | Bimonte et al. | 379/221 |
| 4,585,904 | 4/1986 | Mincone et al. | 379/131 |
| 4,611,094 | 9/1986 | Asmuth et al. | 379/201 |
| 4,685,127 | 8/1987 | Miller et al. | 379/221 |
| 4,763,191 | 8/1988 | Gordon et al. | 379/246 |
| 4,852,154 | 7/1989 | Lewis et al. | 379/246 |
| 4,866,763 | 9/1989 | Cooper et al. | 379/221 |
| 4,897,867 | 1/1990 | Foster et al. | 379/246 |
| 4,924,500 | 5/1990 | Lewis et al. | 379/221 |
| 5,014,125 | 5/1991 | Pocock et al. | 358/86 |
| 5,236,199 | 8/1993 | Thompson, Jr. | 379/90 |
| 5,237,604 | 8/1993 | Ryan | 379/211 |
| 5,282,244 | 1/1994 | Fuller et al. | 379/221 |
| 5,353,331 | 10/1994 | Emery et al. | 379/67 |
| 5,400,395 | 3/1995 | Berenato | 379/114 |
| 5,414,773 | 5/1995 | Handelman | 379/93 |
| 5,418,844 | 5/1995 | Morrisey et al. | 379/207 |
| 5,448,632 | 9/1995 | Iyob et al. | 379/112 |
| 5,452,350 | 9/1995 | Reynolds et al. | 379/115 |
| 5,473,630 | 12/1995 | Penzias et al. | 379/130 |
| 5,473,679 | 12/1995 | La Porta et al. | 379/221 |
| 5,515,425 | 5/1996 | Penzias et al. | 379/114 |

*Primary Examiner*—Krista M. Zele
*Assistant Examiner*—Scott Wolinsky
*Attorney, Agent, or Firm*—Henry T. Brendzel

[57] ABSTRACT

A signaling provider network which receives and transmits at least a subset of all signaling information associated with a particular call or communication service, allows the received/transmitted signaling information to be processed independently of the originating or terminating communication carrier network which originates and/or completes the call, or provides the communication service.

13 Claims, 5 Drawing Sheets

| SUBSCRIBER'S ADDRESS | | INCOMING SERVICES | | | OUTGOING SERVICES | |
|---|---|---|---|---|---|---|
| | | CALLING NUMBER DELIVERY | CALL FORWARDING ALL CALLS | VOICE MESSAGING | INTERCHANGE CARRIER SELECTION | OUTGOING CALL BLOCKING |
| SUBSCRIBER 1 | 201 576-1234 | YES | NO | NO | YES | YES |
| SUBSCRIBER 2 | 201 580-9876 | NO ..... | YES ..... | YES ..... | NO ..... | NO ..... |
| ... | ... | | | | | |

METHOD AND SYSTEM FOR DELIVERING A COMMUNICATION SERVICE

TECHNICAL FIELD

This invention relates to communication systems.

BACKGROUND OF THE INVENTION

In today's communications environment, it is quite common for a user to subscribe to services (including signaling services) offered by different communications carrier networks, such as a Local Exchange Carrier (LEG) network, a Cellular Communications Carrier network and a Community Antenna Television (CATV) distribution network better known as a "cable television network". While some of these networks are sometimes connected at the physical level, no comprehensive logical mechanism currently exists to allow a subscriber of a specific one of these networks to benefit from features and signaling services offered by another one of these networks for calls routed through that specific network. For example, prior an communications systems do not allow signaling services that may be offered by a CATV network to be available to a LEG subscriber for calls routed exclusively over the facilities of that LEC network.

SUMMARY OF THE INVENTION

The present invention is directed to a method and apparatus for a) communicating signaling information which is associated with a communication service between a first network (e.g., a signaling provider network) and a caller device over a first facility, and b) establishing a connection for said communication service between the caller device and a second network through a communication path which includes a second physical facility which is separate and distinct from the first facility and which is connected to said caller device. The signaling provider network may be an independent network or a subnetwork of a communications carrier network, such as a LEC, a CATV, an interexchange carrier, or a cellular communications network.

In preferred embodiments of the invention, a premises-based signaling transfer device that is physically connected to at least one end-user device and at least one communications carrier network, recognizes and intercepts at least one signaling message that is initiated by, or destined for the end-user device. For outgoing communications services, the signaling transfer device detects signaling indicia, such as Q.931 signaling messages or Dual Tone Multi-Frequency (DTMF) signals, generated by the end-user device and forwards those signaling indicia to a signaling provider network via the access facilities of a selected communications carrier network. Upon receiving the signaling information, the signaling provider network processes that information, and returns to the signaling transfer device other information that is used for the delivery of the communications service to the user.

For incoming communications services, the signaling provider network intercepts at least a subset of signaling messages destined for the end-user device or the terminating communications carrier network. The signaling provider network processes those signaling messages and forwards information associated with those signaling messages to the signaling transfer device via the egress transmission facilities of a selected communications carrier network.

DETAILED DESCRIPTION

Figure 1:
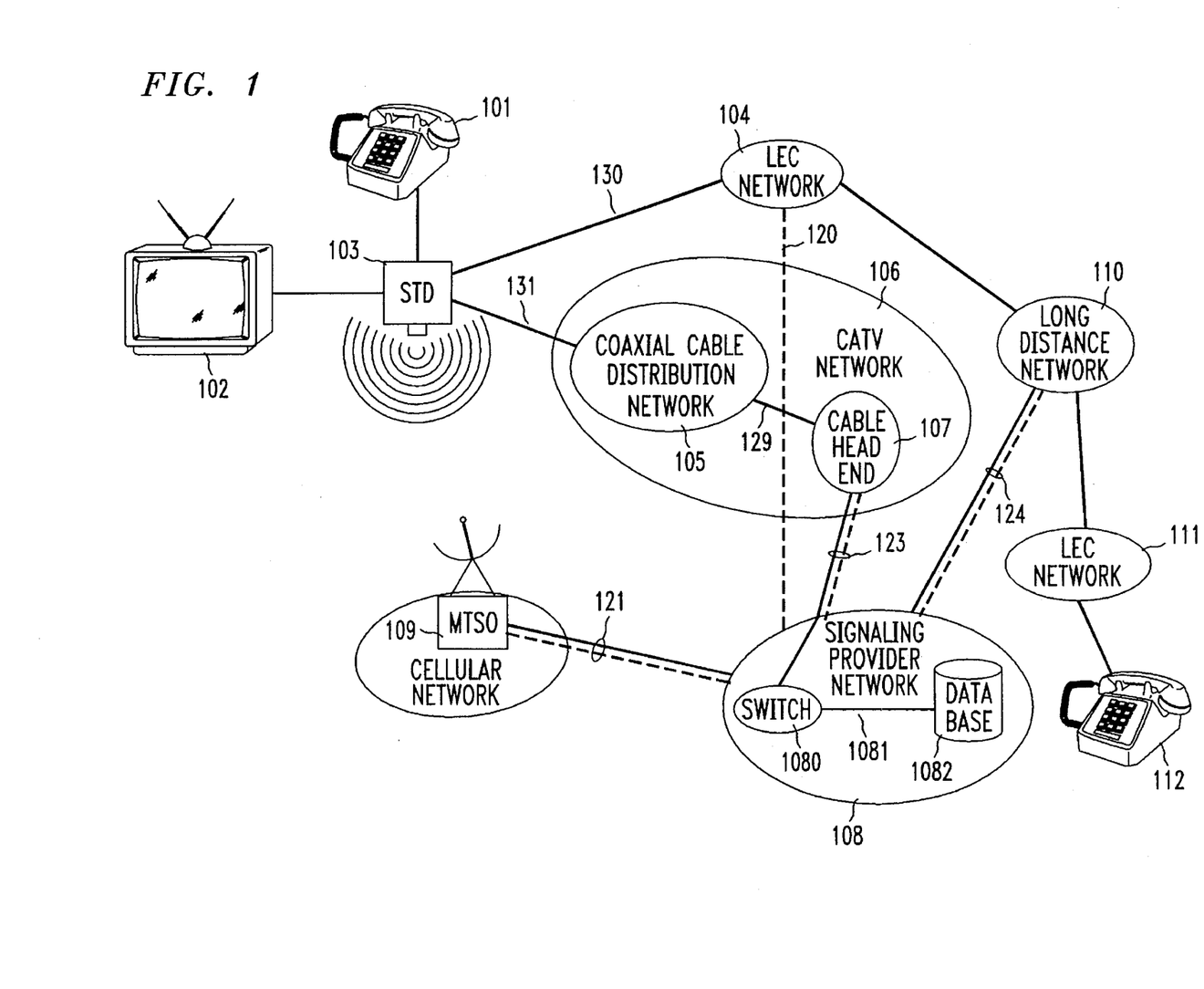
FIG. 1 shows a block diagram of a narrowband communications system arranged in accordance with the principles of the invention.

The block diagram of FIG. 1 illustrates a communications system that is arranged to complete calls and to relay signaling information between an end-user device and a signaling provider network. Specifically, when an end-user device, such as a telephone set 101 requests communications services, such as call completion to telephone set 112, signaling indicia, such as call setup DTMF tones or Q.931 signaling messages are generated by the end-user device and forwarded to a signal transfer device 103. The telephone set 101 may include a display device, such as a 34A caller-id display unit from AT&T, which is an add-on screen which permits the received number of a caller to be painted on the screen as the telephone is ringing. As described in further detail below, the Signaling Transfer Device (STD) 103 is arranged to recognize and separate signaling information from end-user information (payload). Depending on the signaling information received, the STD 103 sends either a) modulated signaling indicia to a Community Antenna Television (CATV) network 106 or a cellular communications network 109, or b) unmodulated signals to a Local Exchange Carrier (LEC) Network 104. The latter, like the LEC network 111, is comprised of switching and signaling systems that are interconnected by transmission facilities and that are designed to route calls and signaling information to their proper destination. LEC network 104 is connected to STD 103 via line 130 which may be comprised of multiple pairs of telephone wire. One of these wires can be used for a nailed up connection from STD 103 to signaling provider network 108 via LEC network 104 and line 120.

Similarly, RF modulated signals that are received from the STD 103 are routed through a CATV network 106 to the signaling provider network 108. Specifically, the RF modulated signals are routed via an upstream channel in a coaxial cable distribution 105 to a cable headend 107. The coaxial cable distribution network 105 is comprised of amplifiers that are placed at predefined distances from each other and that arranged to keep RF forward and reverse directions signals at a desired strength or amplitude. The coaxial cable distribution network 105 also includes coaxial cables which connect the amplifiers, and through which RF signals supporting frequencies ranging from 5 to hundreds of megahertz (MHz) are transmitted. The cable headend 107 is comprised a) of a master antenna, or a group of antenna ordinarily mounted on a tower b) one or more modulators and demodulators, and c) microwave transmission systems and/or earth stations arranged to transmit and receive signals to other entities. In this example, signals that are transmitted or received from another entity, namely, a signaling provider network 108, are carried over a transmission facility 123. Specifically, modulated signaling information received from the STD 103 via the coaxial cable distribution network 105 is demodulated (i.e, stripped of the carrier signal) in the cable headend 107 and formatted for transmission to the signaling provider network 108. Conversely, signaling information received from the signaling provider network 108 and routed to the STD 103 via the CATV network 106 is modulated (i.e., supplied a carrier signal to be modulated by the composite video signal) in the headend 107 for transmission to the STD 103. Likewise, modulated signaling information that is received from the STD 103 and routed via a cellular network 109, is demodulated in a Mobile Telephone Service Office (MTSO) 140 and converted to an appropriate format for transmission to the signaling provider 108 via a facility 121. The cellular communications carrier 109 is arranged to provide wireless communications services including paging services to subscribers. Additional information regarding wireless communications systems can be found in AT&T Technical Journal, Volume 72, Number 4, July/August 1993.

Figure 3:
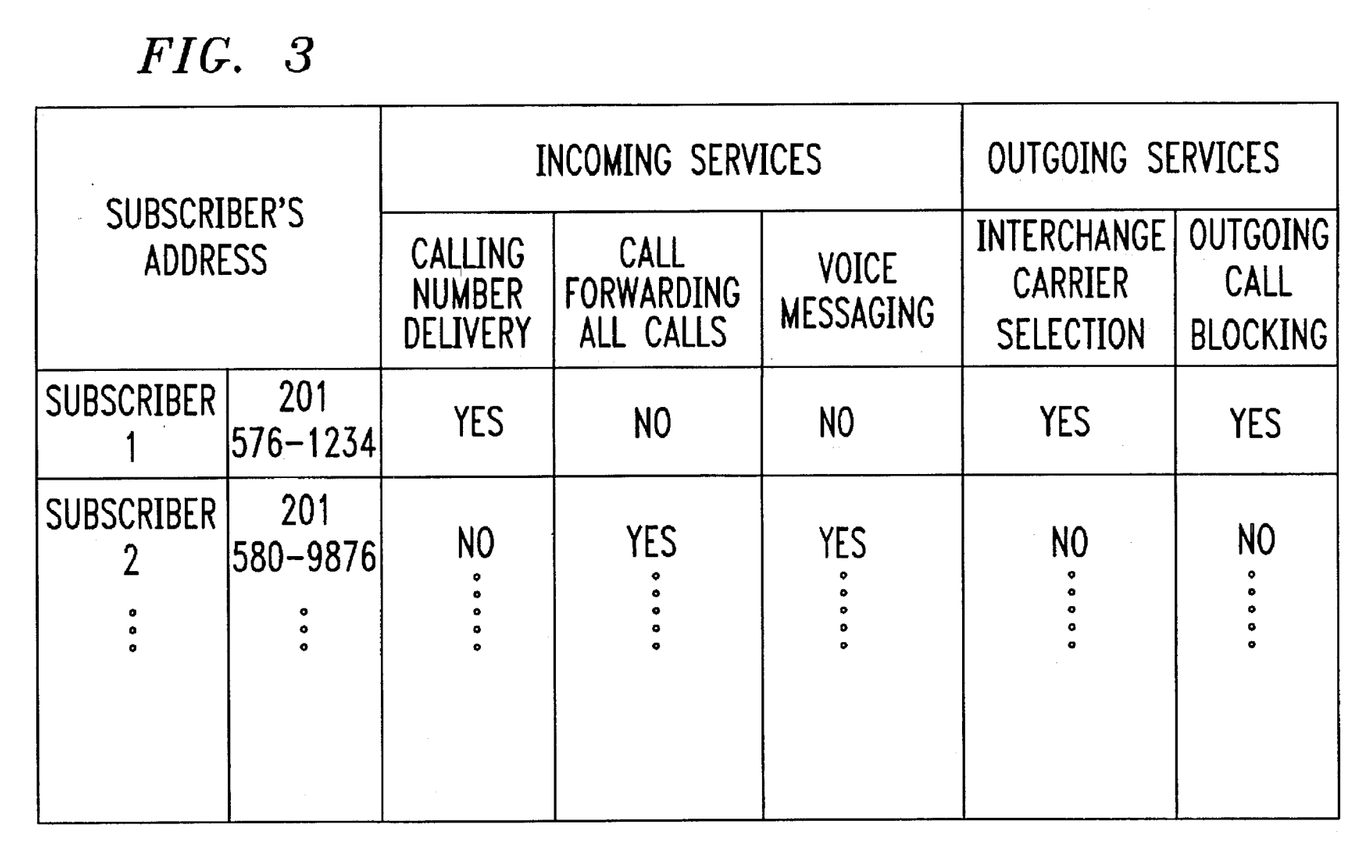
FIG. 3 shows a table illustrating subscribers' profiles that are stored in a signaling provider's network.

The signaling provider network 108 is comprised of a central office switch 1080 which may be implemented using the AT&T No. 5ESS®, when it is adapted with modulators and demodulators designed for transmitting signals over CATV and cellular networks. The switch 1080 is connected to a database 1082 via a line 1081. The database 1082 is a processor-controlled centralized database facility which stores the type of information that is shown in FIG. 3 (described below) and that is associated with features and signaling services selected by a subscriber. The database 1082 also stores programming instructions and associated data for the features and services offered by the signaling provider network 108. For example, the database 1082 may store the programming instructions and tariff data for determining the lowest tariff rate among the rates offered by all Interexchange Carriers (IXC) serving the geographical area of the subscriber. As is well known in the art, the tariff rate charged for a long distance call varies from one IXC to the next and depends on factors, such as time of day, day of the week, day of the year, etc, that are implemented differently by each IXC.

Although the signaling provider network 108 is shown in FIG. 1 as a separate network independent of the other networks depicted in FIG. 1, it would be appreciated that the features and functionality provided by the signaling network 108 can be included in any of the networks shown in FIG. 1.

Also shown in FIG. 1 is a long distance network 110 which includes interconnected toll switching and signaling systems for routing calls and signaling information. In this example, the long distance network 110 has a signaling link 124 to the signaling provider network 108. When the long distance network 110 receives signaling information for incoming calls from the LEG network 104 or 111, a query is launched by the long distance network 110 to the signaling provider network 108 to a) assess proper treatment for the call and, b) to determine a signaling path for signaling information that may be routed to the called party. Responses to the database query are communicated to the long distance network 110 via the link 124.

Figure 2:
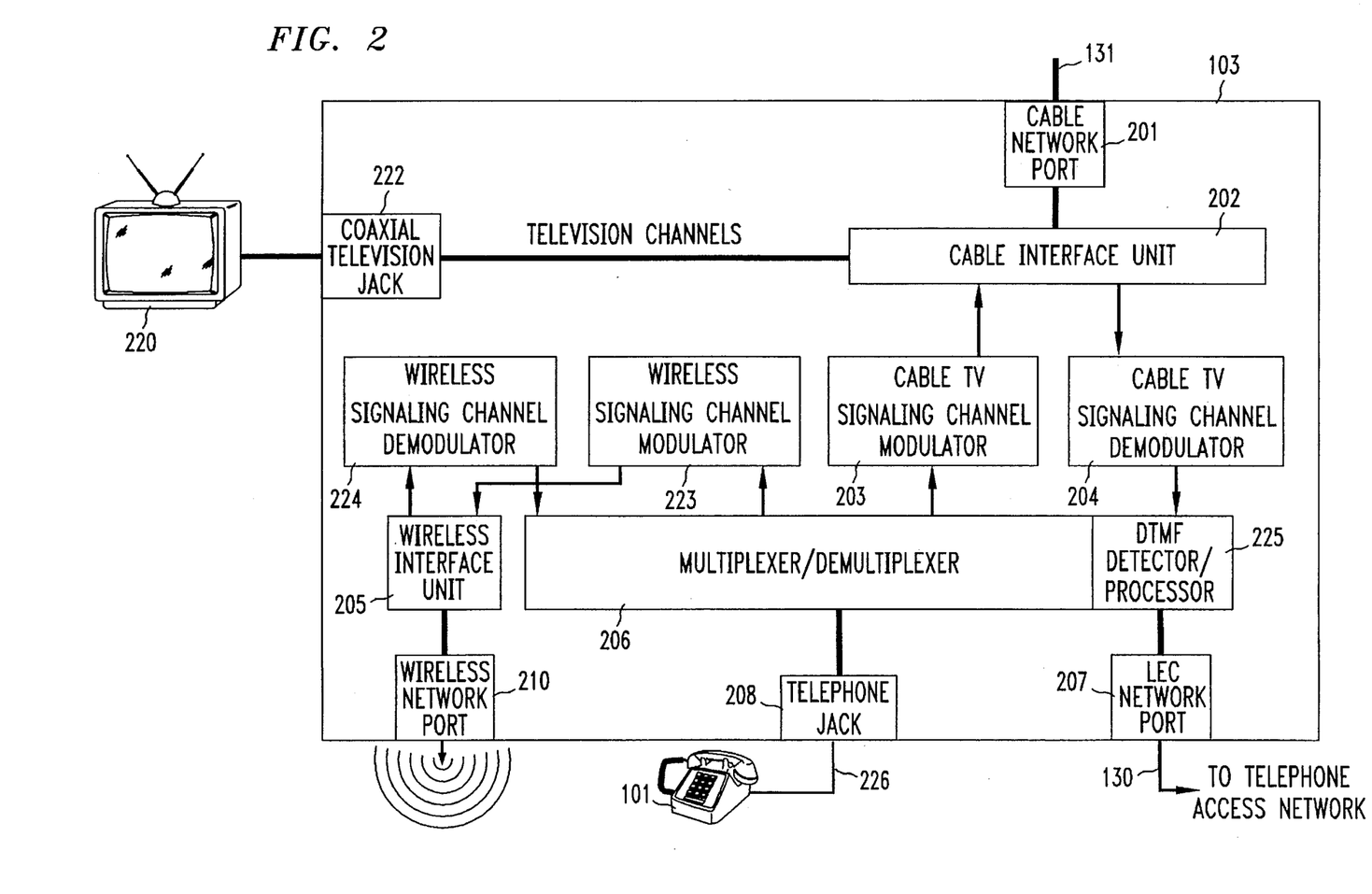
FIG. 2 is an illustrative block diagram of a signaling transfer device arranged in accordance with the principles of the invention and that can be used in the communication system of FIG. 1.

FIG. 2 is an illustrative block diagram of a signaling transfer device arranged in accordance with the principles of the invention. The signaling transfer device 103 shown in FIG. 2 depicts a cable interface unit 202, modulators 203 and 223, demodulators 204 and 224, a wireless interface unit 205 and a multiplexer/demultiplexer 206. The signaling transfer device 103 also includes ports for access/egress to communications carrier networks, namely, a cable network port 201 for communications with the CATV network 106 of FIG. 1, a LEC network port 207 for signal reception and transmission to the LEC network 104 of FIG. 1, and a wireless network port 210 for communications with the cellular network 109 of FIG. 1. The cable interface unit 202 is the point of access and egress for signaling and user information that is sent to, and received from the CATV network 106 via the coax cable link 131. The cable interface unit 202 may be implemented using a diplex filter which is a component in most two-way coaxial amplifiers. In particular, the cable interface unit 202 is arranged to provide a high frequency band pass between a coax cable link 131 and the downstream signaling channel demodulator 204. Similarly, the cable interface unit 202 provides a low-frequency band pass between cable system signaling channel modulator 203 and the coax cable link 131. Hence, the cable interface unit 202 controls the allocation of upstream and downstream channels between the end-user devices, such as the telephone set 101 and the television set 220, and the head end 107 of the CATV network 106. Additionally, the cable interface unit 202 separates "entertainment channels" (and possibly other channels) from signaling channels that carry information destined for, or received from the signaling provider network 108. Similarly, the multiplexer/demultiplexer 206 separates signaling channels from other channels that carry voice information for Plain Old Telephone Service (POTS) calls. Specifically, the multiplexer/demultiplexer 206 includes a DTMF detector/processor 225 capable of detecting DTMF tones received from, or sent to the telephone set 101 (via the line 226 and the jack 208) or the LEC network via the access/egress line 130. The DTMF detector/processor 225 is also arranged to detect tones or digital signals associated with special characters on a dialpad and route subsequent tones or digital signals to either the port 207, the modulator 203 or the modulator 223. For example, numbers that are dialed on the telephone set 101 and that are preceded by a pound sign or an asterisk sign can be routed to the port 207 or the modulator 223. Alternatively, an A/B/C switch may be connected to the port 208 to allow a user to select a particular transport provider to route at least a subset of his/her signaling information to signaling provider network 108. Additionally, the STD 103 could be hard-wired to the signaling provider network 108 For ISDN implementation, the multiplexer/demultiplexer 206 recognizes and separates Q.931 signaling messages from other digital signals that carry user information to be switched over the LEC network. The wireless Interface unit 205 plays a similar role of separating signaling information from user-data information received from, or transmitted to cellular communication carrier network 109.

When the CATV network 106 provides the transport facilities for signaling messages destined for the signaling provider network 108, outgoing signaling information (DTMF tones or ISDN Q.931 signaling messages) that have been detected and separated by the multiplexer/demultiplexer 206 are modulated in the upstream signaling channel modulator 203 before they are forwarded to cable interface unit 202. The latter then sends the modulated signals to the cable interface unit 201 for transmission to the signaling provider network 108 via the transport facilities of the CATV network 106. As is well known in the art, a modulator converts a signal to a format suitable for transmission over a particular network or medium. The modulation process is based on the transmission scheme and the carrier frequencies that are used for transport in the particular network. Thus, the modulator 203 converts the DTMF tones or digital Q.931 messages into RF signals for transmission over the CATV network 106.

Similarly, when the cellular communications network 109 provides the transport facilities for signaling messages destined for the signaling provider network 108, signaling information received from the multiplexer/demultiplexer 206 are modulated in the signaling channel modulator 223 and forwarded in modulated format to the wireless interface unit 205 for transmission to the signaling provider network 108 via the facilities of the cellular communication carrier 109.

For incoming signaling information received from the signaling provider network 108 via the cable network port 201 (cellular network port 210), that information is demodulated in the CATV signaling channel demodulator 204 (wireless signaling channel demodulator 224) before it is forwarded to the multiplexer/demultiplexer 206 to allow the delivery of the communication service associated with that signaling information.

FIG. 3 shows a table illustrating subscribers' profiles that are stored in a database 1082 in the signaling provider network 108 of FIG. 1. The table of FIG. 3 contains information that is grouped under three major headers, namely, subscriber's address, incoming services and outgoing services. Under the incoming services and the outgoing services headers are shown fields associated with customized signaling features and services that are provided by the signaling provider network 108. These features can be provided in competition with similar services offered by the LEC network 104, the cellular network 109, the Long distance network 110 or the CATV network 106. Alternatively, those features and services can be offered by the signaling provider 108 when the networks 104, 105, 106 and 110 singly or in combination are unable or unwilling to provide those features and services for economic and/or technical reasons. Those reasons include a) absence of a critical mass of potential subscribers for those services to be offered profitably, and b) lack of state-of-the-art central office switching and signaling system to offer those features and services. Other information that may be stored in the database 1082 includes transport provider carrier information for incoming calls.

Shown in FIG. 3 is the subscriber's address field which typically identifies the telephone number of a subscriber. For outgoing calls, the subscriber's address data is the calling party number which is sent (along with the called party number) by the STD 103 to the signaling provider network 108. By contrast, for incoming calls, the subscriber's address data is the called party number which is received by the signaling provider network 108 along with the calling party number. FIG. 3 also depicts a non-exhaustive list of fields associated with customized incoming signaling services that are available to a user for subscription. In this example, user-1 subscribes to calling number delivery service also known as "caller-id" service. This feature/service allows the telephone number of a caller that is received by the signaling provider network 108, to be passed to the STD 103 for display to a subscribing called party, as described in further detail below. The "YES" in the Call Forwarding All Calls (CACF) field indicates that subscriber-2 has subscribed to a user-activated feature which permits all calls directed to the subscriber's address associated with that user to be diverted to a different telephone number provided by the user. In this example, the switch 1080 in the signaling provider network 108, replaces the received called number with the forwarded destination number provided by the user, and transmits the (forwarded) replaced called number to the LEC network 104 or cellular network 109 to complete the call to the forwarded destination number. The voice messaging feature enables a subscriber to instruct the signaling provider network 108 to direct incoming calls to a voice messaging system. In particular, when this feature is activated by the subscriber, the signaling provider network 108, upon receiving a signaling message indicating that a call is destined for the subscriber's address a) replaces the subscriber's phone number in the called party field of the message with one of the telephone numbers of the voice messaging system, and b) routes that message to the LEC network 104 or the cellular network 109 to complete the call to the voice messaging system. The latter can reside in the LEC network 104 (111), the cellular network 109, the CATV network 106 or the Long Distance network 110. The signaling provider network 108 sends a message to the STD 103 via either the CATV network 106 or the cellular network 109 to indicate that a voice mail message has been received. This message is recognized by a flashing lamp in the STD 103 or other forms of attention-grabbing schemes.

Also shown in FIG. 3 is a list of fields representing outgoing features and services to which a user may subscribe. The non-exhaustive list of fields includes interexchange carrier selection, and outgoing call blocking. Interexchange carrier selection is a feature which allows a subscriber to route a long distance call via the network of the interexchange carrier which charges the lowest rate for the call. This feature is described in further detail below. Outgoing call blocking is a feature which prevents calls that are destined for particular addresses pre-selected by a subscriber from being completed. For example, calls directed to 900 number destinations can be blocked. In particular, when a subscriber, such as user-1 dials a 900 number, the calling party number, in this case 201-949-2000 along with the called party number (i.e., the 900 number) is transmitted by STD 103 to the signaling provider network 108 via the facilities of the CATV network 106 or the cellular network 109. The calling party number is used as a search key by database 1082 to inquire as to whether user-1 has subscribed to the outgoing call blocking feature. Upon a positive answer to that inquiry, a table lookup operation is performed in the database 1082 to determine whether the called party number received from the STD 103 is among the list of numbers to which service should be denied. If so, the signaling provider network 108 sends a signaling message to the STD 103 indicating that a busy tone signal should be forwarded to the caller. The generation of the actual tone is done by the DTMF detector/processor 125 in the STD 103.

Figure 4:
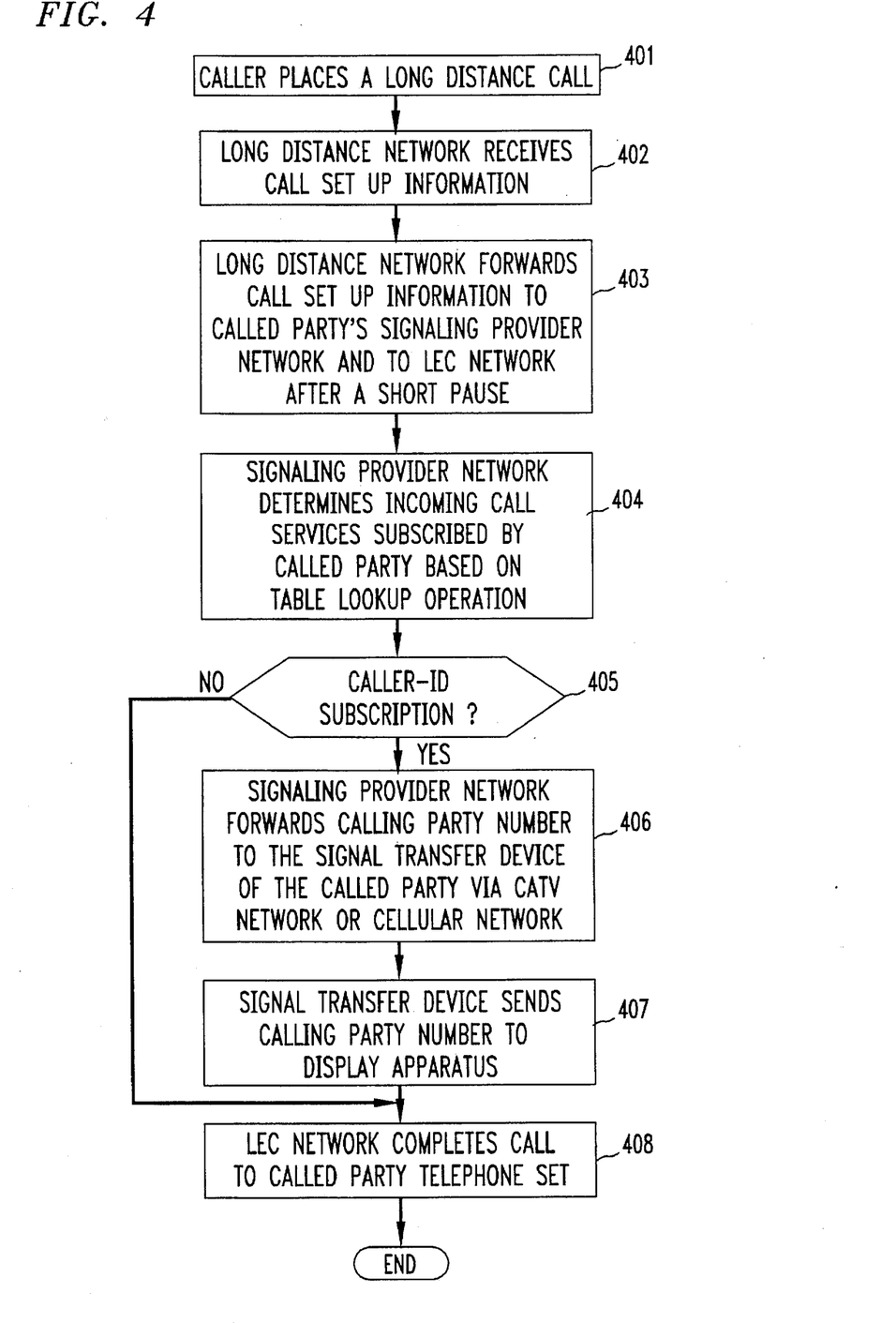
FIGS. 4 and 5 are flowcharts describing the logical sequence of steps in methods for communicating signaling messages in the communications system of FIG. 1.

The logical sequence of steps for providing to a subscriber an incoming signaling service, such as caller id within the network of FIG. 1, is illustrated in the flowchart of FIG. 4. The process is initiated in step 401 when a caller, say at the station set 112, dials a telephone number, such as the number associated with the telephone set 101. Upon receiving the call setup information, such as calling and called party number, the LEC network 111 forwards that information to the Long Distance Network 110 which receives that information in step 402. The Long distance network 110 first duplicates the call setup information and proceeds in step 403, to send a copy of the call setup information to the called party's signaling provider network, such as the network 106 via the link 124. After a short pause of a predetermined duration, another copy of the call setup information is transmitted to the LEC network 104 to complete the call. Upon receiving the call setup information, the signaling provider network 108, in step 404 uses the called party number as a search key in a table lookup operation within the database 1082 to determine in step 405, whether the called party has subscribed to any particular incoming signaling service, such as caller-id. In response to a positive answer to that inquiry, the switch 1080 of the signaling provider network 108, in step 406, forwards the calling party number (in the form of modulated signals) to either the CATV network 106 or the cellular network 109, based on the signaling transport provider pre-selected by the called party. The signaling transport provider, (i.e., the CATV network 106 or the cellular network 109) transmits the calling party information to the STD 103, using the techniques described above. After the signals representing the calling party number have been demodulated in the STD 103, they are forwarded, in step 407 to the add-on screen of the telephone set 101 for display. Alternatively, when the telephone set 101 has no suitable display apparatus, the calling party number can be displayed on the screen of the television set 102, when a) the CATV 106 is the signaling transport provider and b) the television set 102 is powered. In step 407, the LEC network 104 completes the call to the telephone set 101 via the STD 103.

In the above-described example, the call setup information is forwarded to the signaling provider network 108 by the long distance network 110, as opposed to the LEC network 111, because for the sake of simplicity, no signaling link is arranged between the LEC network 111 and the signaling network 108. Had such a link existed, the LEC network 111 could have forwarded the call setup information directly to the signaling provider network 108. Alternatively, when the telephone set of the calling party (set 112) is connected to a signaling provider network of its own via a CATV network or a cellular carrier network, the call setup information is communicated to the called party signaling provider network by the calling party signaling provider network. It is also worth noting that the duration of the pause between a) the transmission of the call setup information to the signaling provider network 108, and b) the transmission of the same information to the LEC network 104, is selected such that the calling party information is displayed to the called party before, or as the call is completed. In particular, the STD 103 synchronizes the entire process by displaying the calling party number and relaying the call at the appropriate time to the telephone set 101.

Figure 5:
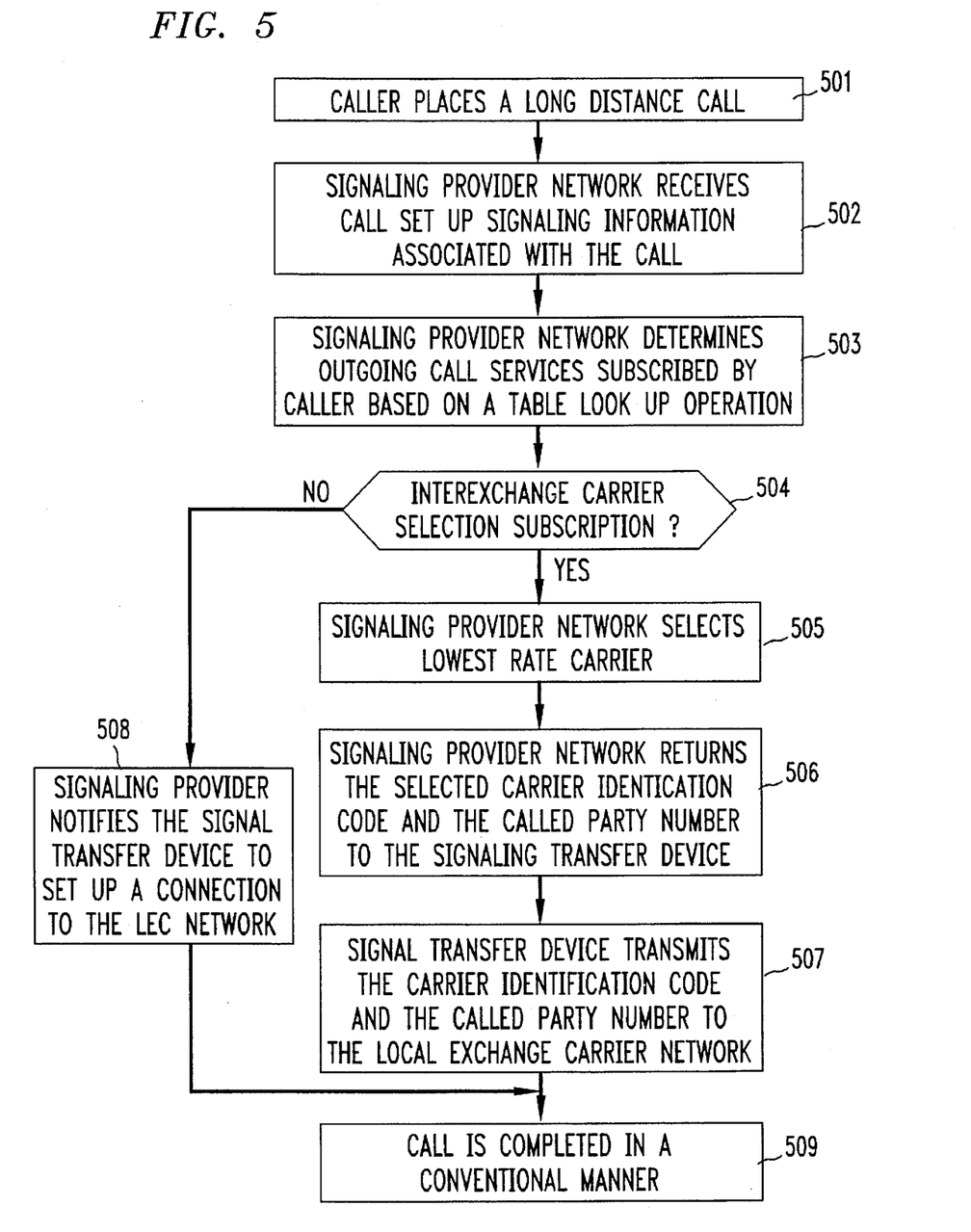

FIG. 5 is a flowchart describing the logical sequence of steps for providing to a subscriber outgoing signaling services, such as interexchange carrier selection within the network of FIG. 1. The process of FIG. 5 is initiated in step 501 when a caller at the station set 101, for example, places a long distance call in step 501. As explained earlier, the call setup information is transmitted to the signaling provider network 108 when the caller enters a special character, such as an asterisk or a pound sign before the dialed number. The special character is interpreted by the DTMF detector/processor 225 as an indication that the caller wishes to send the call setup information number to signaling provider network 108. Thus, the call setup information is transmitted to the signaling provider network 108 by the STD 103 using the techniques described above. Upon receiving the call setup information, the signaling provider network 108, in step 503, uses the calling party number as a search key in a table lookup operation within the database 1082 to determine in step 504, whether the calling party has subscribed to any particular outgoing signaling service, such as interexchange carrier selection. If so, the database 1082 executes the programming instructions that are stored therein and that are associated with the interexchange carrier selection service to identify and select the lowest rate IXC for the call. In step 506, the signaling provider network 108 identifies the Carrier Identification Code (CIC) for that IXC and transmits that code along with the call setup information to the STD 103. The latter transmits the CIC along with the call setup information to the LEC 104. If the calling party is not a subscriber of the interexchange carrier selection service, the signaling provider network 108, in step 508, notifies the STD 103 to set up a connection to the LEC network 104 using the calling party number. The LEC network 104, in step 509, completes the call in a conventional manner.

The foregoing merely illustrates the invention. Those skilled in the art will be able to devise numerous arrangements which, although not explicitly shown or described herein, embody the principles of the invention and are within their spirit and scope.

We claim:

1. A method of delivering a communication service comprising the steps of:

receiving, in a first communications network, signaling information from a signaling device which is coupled to a communications device that generated said signaling information to request a communication service, said signaling information being received in said first communications network via a first facility after having been modulated by said signaling device and then demodulated prior to receipt by said first communications network; and processing the signaling information in said first communications network to generate routing information that is forwarded via said signaling device to a second communications network over a communication path which includes a second facility that is physically distinct from said first facility.

2. The method of claim 1 wherein said processing step includes the steps of:

comparing rates charged by different carriers for said communication service;

selecting the carrier charging the lowest rate;

identifying a carrier identification code for said selected carrier; and generating said routing information indicating that said communication service is to be delivered over said communication path which includes said second facility and transmission facilities of said second communications network which belongs to said selected carrier.

3. The method of claim 1 wherein said communication service is a telephone call and wherein said processing step includes the steps of:

retrieving in said first network a prestored profile associated with a telephone number of a caller who initiated said call; and determining a treatment for said call based on said profile, wherein information indicative of said treatment is included in said routing information.

4. A system for delivering a communication service comprising:

a signaling device;

a first communications network which receives, from said signaling device, signaling information generated by a communication device that is coupled to said signaling device and that requested a communication service, said signaling information being received by said first communications network via a first facility after having been modulated by said signaling device and then demodulated prior to receipt by said first communications network; and a computer system in said first communications network which processes said signaling information to generate routing information that is forwarded via said signaling device to a second communications network over a communication path which includes a second facility that is physically distinct from the first facility.

5. The system of claim 4 wherein said computer system a) compares rates charged by different carriers for said communication service, b) selects the carrier charging the lowest rate, c) identifies a carrier identification code for said selected carrier, and d) generates said routing information to indicate to said signaling device that said communication service is to be delivered via said communication path which includes said second facility and transmission facilities of said second communications network which belongs to said selected carrier.

6. The system of claim 4 wherein said communication, service is a telephone call and wherein said computer system retrieves a prestored profile associated with a telephone number of a caller who initiated said call, and determines a treatment for said call based on said profile.

7. The system of claim 6 wherein said treatment includes blocking said call when said call is directed to a destination preselected as being unreachable.

8. A method of delivering a communication service in response to a communication service request from a communications device coupled to a signaling device, the method comprising the steps of:

sending from the signaling device to a first network a first set of signaling information associated with a communication service, the first set of signaling information being received by the first network via a first facility after having been modulated by the signaling device and then demodulated prior to receipt by the first network; and in response to receipt of the first set of signaling information by the first network, transmitting from the first network to the signaling device a second set of signaling information which is forwarded via the signaling device to a second network for delivery of the communication service, the second set of signaling information being forwarded over a communication path which includes a second facility that is physically distinct from the first facility.

9. The method of claim 8 wherein the second set of signaling information includes a carrier identification code.

10. The method of claim 8 further comprising the steps of:

processing the first set of signaling information in the first network to determine a carrier identification code that is to be included in the second set of signaling information, and that is indicative of a route associated with the communication path and the second network; and in response to receipt of the second set of signaling information by the signaling device, establishing a connection for delivery of the communication service via the route.

11. A system for delivering a communication service in response to a communication service request from a communications device comprising:

a first network;

a signaling device which is coupled to the communications device and which sends to the first network a first set of signaling information generated by the communications device to request a communication service, the first set of signaling information being received by the first network via a first facility after having been modulated by the signaling device and then demodulated prior to receipt by the first network; and a processor in the first network which generates a second set of signaling information in response to receiving the first set of signaling information, and which transmits to the signaling device the second set of signaling information which is forwarded via the signaling device to a second network for delivery of the communication service, the second set of signaling information being forwarded over a communication path which includes a second facility that is physically distinct from the first facility.

12. The system of claim 11 wherein the second set of signaling information includes a carrier identification code.

13. The system of claim 11 wherein the processor determines a carrier identification code that is to be included in the second set of signaling information, and that is indicative of a route associated with the communication path and the second network, and wherein the signaling device, in response to receiving the second set of signaling information, establishes a connection for delivery of the communication service via the route.

* * * * *

UNITED STATES PATENT AND TRADEMARK OFFICE
CERTIFICATE OF CORRECTION

| | |
|---|---|
| PATENT NO. | : 5,563,939 |
| DATED | : October 8, 1996 |
| INVENTOR(S) | : Thomas La Porta, Malathi Veeraraghauan |

It is certified that error appears in the above-identified patent and that said Letters Patent is hereby corrected as shown below:

Please replace the original formal drawings with the enclosed new-revised set.

Signed and Sealed this

Sixteenth Day of October, 2001

Attest:

*Nicholas P. Godici*

NICHOLAS P. GODICI
*Attesting Officer     Acting Director of the United States Patent and Trademark Office*

| SUBSCRIBER'S ADDRESS | | INCOMING SERVICES | | | OUTGOING SERVICES | |
|---|---|---|---|---|---|---|
| | | CALLING NUMBER DELIVERY | CALL FORWARDING ALL CALLS | VOICE MESSAGING | INTERCHANGE CARRIER SELECTION | OUTGOING CALL BLOCKING |
| SUBSCRIBER 1 | 201 576-1234 | YES | NO | NO | YES | YES |
| SUBSCRIBER 2 | 201 580-9876 | NO | YES | YES | NO | NO |
| ... | ... | ..... | ..... | ..... | ..... | ..... |

FIG. 4